United States Patent [19]

Logan et al.

[11] Patent Number: 5,354,544
[45] Date of Patent: Oct. 11, 1994

[54] SELECTIVE REDUCTION OF NITRIC OXIDE

[75] Inventors: Anthony D. Logan, Chandler, Ariz.; Clifford N. Montreuil, Dearborn, Mich.

[73] Assignee: Ford Motor Company, Dearborn, Mich.

[21] Appl. No.: 173,230

[22] Filed: Dec. 27, 1993

[51] Int. Cl.$^5$ .................. B01D 47/00; B01D 53/34
[52] U.S. Cl. .................. 423/213.7; 423/235; 423/239.2; 423/212
[58] Field of Search .......... 423/212, 213.2, 213.7, 423/235, 239.2

[56] References Cited

U.S. PATENT DOCUMENTS

| | | | |
|---|---|---|---|
| 3,801,696 | 4/1974 | Mark | 423/212 |
| 3,867,507 | 2/1975 | Myerson | 423/212 |
| 4,029,739 | 6/1977 | Senjo et al. | 423/235 |
| 4,473,535 | 9/1984 | Kittrell et al. | 423/239.2 |
| 4,519,993 | 5/1985 | McGill et al. | 423/235 |
| 4,656,014 | 4/1987 | Walstein | 423/235 |
| 4,946,659 | 8/1990 | Held et al. | 423/212 |
| 4,950,473 | 8/1990 | Flockenhaus et al. | 423/235 |
| 4,963,332 | 10/1990 | Brand et al. | 423/235 |
| 4,978,514 | 12/1990 | Hofmann et al. | 423/235 |
| 4,986,897 | 1/1991 | Chin | 208/113 |
| 5,017,347 | 5/1991 | Epperly et al. | 423/235 |
| 5,045,292 | 9/1991 | Rüegg et al. | 423/235 |
| 5,078,982 | 1/1992 | Gardner-Chavis et al. | 423/239.1 |
| 5,085,840 | 2/1992 | Held et al. | 423/212 |
| 5,141,524 | 8/1992 | Gonzalez | 44/340 |
| 5,149,511 | 9/1992 | Montreuil et al. | 423/212 |
| 5,149,512 | 9/1992 | Li et al. | 423/239.2 |
| 5,171,554 | 12/1992 | Gardner-Chavis et al. | 423/239.1 |
| 5,224,346 | 7/1993 | Berriman et al. | 60/274 |
| 5,227,145 | 7/1993 | Kintaichi et al. | 423/239.1 |

*Primary Examiner*—Michael Lewis
*Assistant Examiner*—Thomas G. Dunn, Jr.
*Attorney, Agent, or Firm*—Lorraine S. Melotik; Roger L. May

[57] ABSTRACT

This invention is directed to a method of treating automotive exhaust gas emissions or stationary source emissions. It comprises introducing an organic hydrocarbon compound or compounds containing nitro or nitroso functional groups into the emissions at a location adjacent the source of emission generation. Thereafter, the compound/emission mixture is exposed to a transition metal exchanged high silica ZSM5 zeolite catalyst. Subsequently, the effluent from the zeolite catalyst is exposed to an oxidation catalyst.

9 Claims, 1 Drawing Sheet

SELECTIVE REDUCTION OF NITRIC OXIDE

BACKGROUND OF THE INVENTION

1. Technical Field

This invention relates to the technology of purifying exhaust gases or emissions of stationary and mobile sources, and more particularly to the technology of cleansing such emissions of $NO_x$ from a stream which may vary from oxygen-deficient (fuel-rich) to oxygen-rich (fuel-lean) or lean burn.

2. Discussion of Related Art

Emissions from large scale stationary sources, containing $NO_x$ and excess $O_2$, are generally treated with ammonia as a reductant over a catalyst containing $V_2O_5$ on $TiO_2$ (see H. Bosch and F. Janssen, "Catalysis Today", Vol. 1(4), 1987). Emissions from mobile sources that do not have excess oxygen but contain $NO_x$ (automotive vehicles) are removed by reaction with in-situ reductants, such as carbon monoxide or hydrocarbons (HC), when passed over a catalyst, often containing rhodium. Such a catalyst would be ineffective in the presence of a large excess of $O_2$ (see K. C. Taylor, "Automobile Catalyst Converters", Springer, Berlin, 1984).

Recently, copper-exchanged zeolites have been used to reduce $NO_x$ in the presence of excess oxygen (see U.S. Pat No. 4,934,142 and Japanese patent application publication No. Hei 3-52644, 3/6/91), but to attain substantial conversion efficiencies at the moderate temperatures of an exhaust produced by a lean-burn engine, a temporary fuel rich condition is required to provide a residual HC reductant. Unfortunately, it is not desirable to operate an automotive engine or other emission source under artificially fuel rich conditions simply to facilitate catalytic conversion of the engine emissions (see M. Iwamoto et al, Applied Catalysis, Vol. 69. L 15–19, 1991). To facilitate conversion of $NO_x$ under conditions of excess oxygen, without the need for stimulating high HC in the exhaust, alkane and alkene additions have been suggested as reductants injectable into the emissions ahead of the zeolite (see S. Sato et al. Applied Catalysis, Vol. 70, L 1–5 (1991)). However, it is difficult to meter small doses of such gaseous reductants to match accurately the varying $NO_x$ content of the exhaust gas and to reliably and safely store such gaseous reductants on-board a vehicle.

In an effort to reduce $NO_x$ emissions, Montreuil et al., in U.S. Pat 5,149,511 discloses injecting a water-soluble, oxygenated hydrocarbon such as propanol as a reductant into exhaust gas emissions having excess oxygen; the emissions then are exposed to a transition metal-exchanged high silica ZSM5 zeolite.

It would be advantageous if a reductant could be employed which doesn't require oxygen in the fuel stream and yet converts a high percentage of $NO_x$. It would be further advantageous if such a reductant would also be effective in converting $NO_x$ in a fuel-lean (oxygen rich) environment. That is, such a reductant would extend the conversion range for $NO_x$ from oxidizing (fuel lean) to reducing (fuel rich) conditions. It would further be desirable to provide a reductant which has little affect on reducing the activity of the catalyst during operation. The present invention catalyst provides these advantages.

SUMMARY OF THE INVENTION

The invention is directed to a method of treating gas emissions by the steps comprising: (a) introducing an organic hydrocarbon compound containing a nitro or nitroso functional group into the exhaust gas emissions as a reductant and at a location adjacent to the source of the emission generation; (b) substantially immediately exposing the reductant/emission mixture to a transition metal-exchanged high silica zeolite catalyst at a compatible space velocity and (c) sequentially exposing the effluent of such zeolite catalyst to an oxidation catalyst.

Preferably, the compound is water soluble and is introduced by injection of a water/reductant solution correlated in an appropriate amount with respect to the $NO_x$ in the instantaneous exhaust gas.

BRIEF DESCRIPTION OF THE DRAWINGS

FIG. 1 shows the effect of temperature and FIG. 2 shows the effect of oxygen concentration in the gas mixture.

DETAILED DESCRIPTION OF PREFERRED EMBODIMENTS

Figure 1:
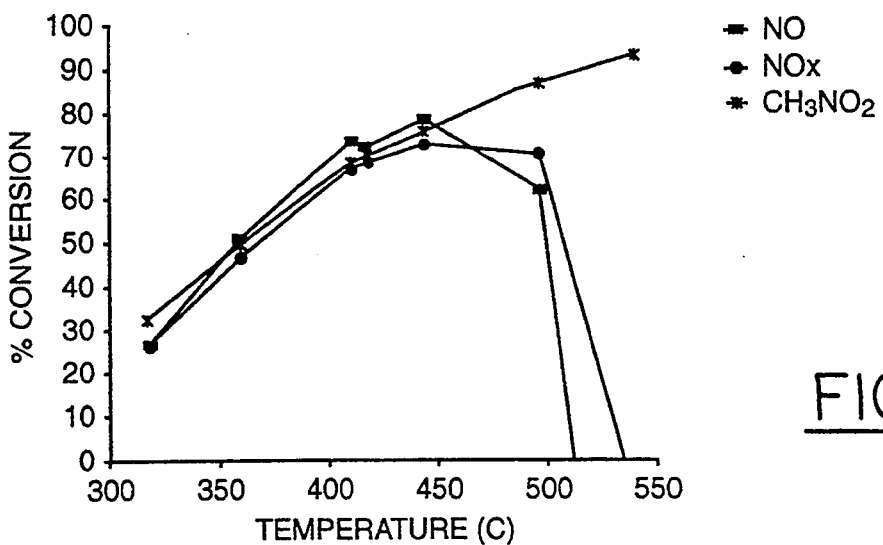
FIGS. 1 and 2 are graphical illustrations of the percent conversion efficiency for reduction of nitric oxide in a gas mixture using nitromethane as a reductant according to embodiments of the present invention.

The method of this invention is operative to cleanse the exhaust gas generated by a fossil-fueled engine, particularly a gasoline-fueled internal combustion engine if operated under a variety of conditions, i.e., from lean-burn conditions (oxygen-rich) to fuel rich (oxygen poor) conditions. Lean burn is generally used herein to mean: for a gasoline engine, an A/F ratio between about 15–23. Fuel rich is generally herein used to mean: for a gasoline engine, rich condition correspond to an A/F ratio $<14.7$. The method of this invention for treating exhaust gas emissions comprises (a) introducing an organic hydrocarbon compound containing a nitro or nitroso functional group into the emissions as a reductant and at a location closely adjacent the generating source for said emissions; (b) substantially immediately exposing the reductant/emission mixture to a transition metal-exchanged, high silica zeolite catalyst ($SiO_2$/$Al_2O_3$ ratio preferably between 10–50) at a compatible space velocity; according to this embodiment the preferred zeolite is type ZSM5; and (c) sequentially exposing the effluent from the zeolite catalyst to an oxidation catalyst. The emissions can be those from an automotive engine or a stationary source.

The zeolite is of the transition metal exchanged type; the transition metal can be selected from the group consisting of copper, cobalt, nickel, chromium, iron, manganese, silver, zinc, calcium, and compatible mixtures thereof.

Zeolites, in general, are aluminosilicates with a framework containing cations such as those of alkali metals and alkaline earth metals. The framework of a zeolite is based on the combination of $AlO_4 + SiO_4$ tetrahedrons. Only synthetically produced zeolites are suitable for this invention.

ZSM5 is a crystalline zeolite and is disclosed in U.S. Pat. No. 3,702,886, the disclosure of which is incorporated herein by reference. ZSM5 can have a $SiO_2$/$Al_2O_3$ ratio ranging from about 10 to 1000. Preferably in this invention the $SiO_2/Al_2O_3$ ratio is 10–50. The copper ion-exchanged version of such zeolite may be obtained by stirring a proportion of copper acetate solution (preferably about 0.05M) with the ZSM5 zeolite. The material is filtered, washed, and preferably ion-exchanged three times. It is then dried at about 120° C. for about three hours and calcined at about 600° C. for about three hours. The resulting material will contain copper exchanged for cation(s) of an alkali metal or of a proton of the zeolite as well as copper impregnated onto the zeolite, resulting in a total copper content of about 3% by weight. For instance, the copper ions will replace the sodium ions in the zeolite. The limit is set by the amount of $Al_2O_3$ in the zeolite. It is advantageous to provide as much transition metal (copper) in the zeolite as possible since the amount of copper present in the zeolite is directly related to the catalytic activity of the catalyst. The copper-exchanged zeolite may contain copper in the weight percent range of 1–8% and will be stable up to a temperature of about 600° C. The zeolite catalyst is advantageously coated onto a monolithic or pelleted support which is placed in the exhaust stream to flow therethrough.

The reductant compound is selected from the class of organic hydrocarbon compounds that contain a nitro or nitroso functional group and the selected compounds from this class preferably produce $NO_x$ conversion efficiency of at least 40% even when there is no excess oxygen in the gas to be treated. $NO_x$ is used herein to mean NO, $NO_2$, and mixtures thereof. The $NO_x$-containing gas to be treated according to the present method usually contains $NO_x$ in an amount of at least 100 ppm; the gas may also contain water vapor, carbon dioxide, and other combustion products. Specific examples of reductant compounds useful in the present invention include, but not limited to, nitrosobenzene, nitromethane, nitroethane, 1-nitropropane, 2-nitroethanol, ethyl nitrate, ethyl nitrite, and mixtures thereof. Nitromethane is the preferred reductant.

The compound, preferably is metered into the exhaust gas stream immediately ahead of the ZSM5 zeolite, and preferably immediately downstream of the combustion zone for generating the emissions. The metering may be carried out by a suitable injection device, such as a well calibrated injector, to atomize an aqueous solution of the compound and achieve a stream mixture at the exhaust gas temperature which is typically about 700°–1100° F. In addition to being injected as an aqueous solution of the compound, the compound could also be injected as the undiluted reductant. It is desired that appropriate amount of the reductant compounds be injected in accordance with the variations of $NO_x$ present in the exhaust gas according to the present invention. This will optimally require a reductant to $NO_x$ ratio of at least about 1 to 1, most preferably about 1 to 1. The variability of the $NO_x$ may be instantaneously measured either as a function of exhaust gas temperature or by use of a direct sensor.

The supply of reductant compounds can be stored in plastic or metal canisters. The pressure of such liquid compounds will be around ambient pressure conditions. This mode of storage is considerably simpler than that required for the injection of alternative gaseous reductants and is considerably safer than the use of urea, ammonia, or gaseous reductants.

The oxidation catalyst downstream of the zeolite catalyst is arranged preferably to have a space velocity of 20–80K $hr^{-1}$. The oxidation catalyst can be selected from numerous known oxidation catalysts including, i.e., but not limited to base metal or noble metal catalysts usually configured as, e.g., $Pt/Al_2O_3$; $Pd/Al_2O_3$; and three-way catalysts. Exemplary of typical three-way catalyst formulations are the following: a platinum-rhodium formulation, with the respective metals in a weight ratio of 5/1, and a loading of 40 grams/$ft^3$ on a ceramic monolith; and a palladiumrhodium formulation, also with a 5/1 ratio and the same loading of 40 grams/$ft^3$.

The method results in an enhancement of conversion efficiency at 4.5% of $O_2$ for $NO_x$ of at least, 25%, compared to conversions obtained employing an equivalent amount of propylene as the reductant. Propylene is commonly employed in this art area for comparison as a reducing species. This comparison is discussed in more detail below.

Flow reactor studies were carried out to corroborate the scope of this invention. Catalyst samples were prepared using a cylindrical cordierite monolithic substrate (400 cells/$inch^2$, 1" diameter, 1.5" length) coated with 32% by weight of a washcoat consisting of ZSM5 zeolite. The ZSM5 had a silica/alumina ratio of 30. The ZSM5, prior to washcoating, had been ion-exchanged in a 0.05M copper-acetate solution overnight, washed in distilled water, and then calcined in 5% oxygen. The samples were analyzed by x-ray fluorescence and found to have a total copper loading of 4.2% by weight.

Experiments were conducted, the first consisted of characterizing the extent of reaction between $NO_x$ and nitromethane according to an embodiment of the present invention and comparing these to the $NO_x$/propylene reaction used as a baseline test.

The first experiments were conducted in a quartz flow reactor under the following steady-state conditions: space velocity 50,000 $hr^{-1}$; temperature 412° C.; base gas stream blend 12% $CO_2$, 10% $H_2O$, 4.0% $O_2$, 460 ppm NO, 2500 ppm nitromethane, balance $N_2$ (no $SO_2$ present). The compound was injected from aqueous solution into the gas stream, as a steam/reductant mixture. Downstream of the reaction, water vapor was extracted by two condensers before sample gases entered the analytical train, and in the condensation process the unreacted water soluble reductants were likewise trapped out. For this reason it was not possible to analyze the post-catalyst reductant concentrations and hydrocarbon conversions are therefore given for the baseline nitromethane runs only. A $NO_x$ conversion of 73% is obtained. For comparison with the present invention, a similar test using an equivalent amount of propylene as the reductant converted only 40% of $NO_x$.

Figure 2:
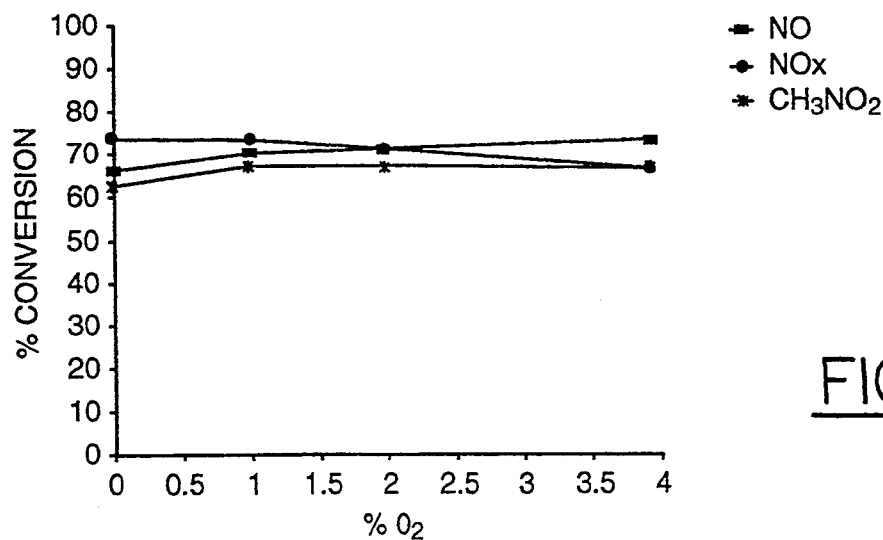
Figure 3:
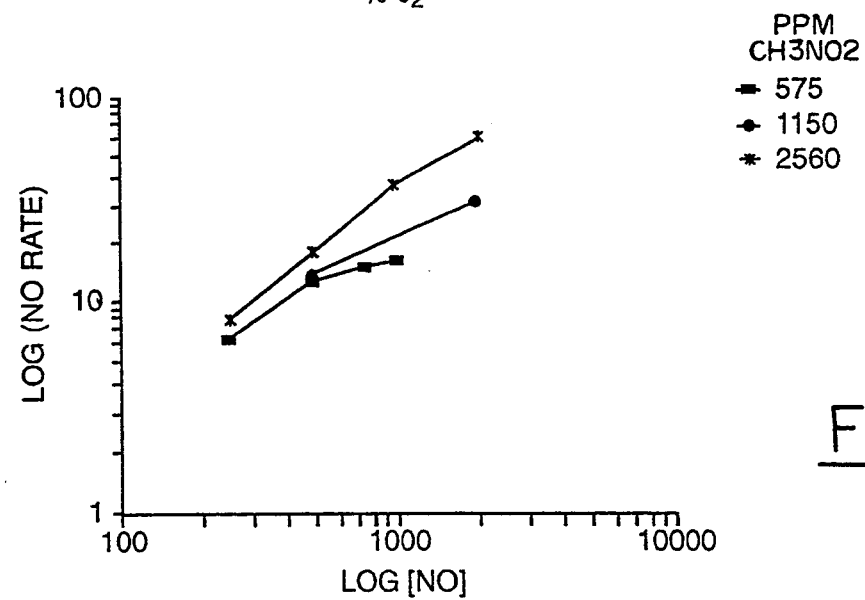
FIG. 3 is a partial pressure plot of nitric oxide conversion versus nitric oxide concentration using nitromethane at A) 2560 ppm, B) 1150 ppm, and C) 575 ppm.

The second sample was identically tested as in the description above, with the sole exception that there is no oxygen present in the gas stream mixture. A $NO_x$ conversion of 65% is obtained employing nitromethane as the reductant according to an embodiment of the present invention. Thus, as shown in FIG. 2, even without oxygen in the gas mixture, a high $NO_x$ conversion is obtained with our invention. In contrast, as taught in U.S. Pat. No. 5,149,511 when employing propylene in a similar gas environment, little or no $NO_x$ conversion would be obtained.

A third sample gas stream contains: 12% $CO_2$, 500 ppm NO, 4% $O_2$, 20 ppm $SO_2$ and the balance nitrogen. As in the other tests, an aqueous solution of nitromethane is added as a gas to the gas stream such that the final gas stream contains 10% water and a nitromethane concentration of 575 ppm. The gases are reacted over an copper exchanged ZSM5 catalyst where the inlet temperature is 412° C. and the space velocity is 50,000/hr. A $NO_x$ conversion of 54% is obtained. This examples shows that $SO_2$ is not a poison using the present invention reductant.

Another gas sample stream contains: 12% $CO_2$, 440 ppm NO, 3.8% $O_2$ and the balance nitrogen. An aqueous solution of nitromethane is injected into the gas upstream of the catalyst such that the final water concentration of the stream is 10% and the final nitromethane concentration is 1460 ppm. The gas inlet temperature is 411° C. and the gas space velocity is 50,000/hr. The gases are reacted over a copper-ion exchanged ZSM5 catalyst on a corderite monolith. A $NO_x$ conversion of 44% is obtained.

A gas mixture composed of 12% $CO_2$, 10% $H_2O$, 4% $O_2$, 20ppm $SO_2$, 440ppm NO and 733ppm nitroethane was passed over a catalyst at a space velocity of 50,000/hr according to another embodiment of the present invention. The inlet temperature was 411° C. The catalyst consisted of a cylindrical monolith, 400 cells/in$^2$, 1 inch diameter by 1.5 inch long. The catalyst has 35% by weight of washcoat consisting of a copper exchanged ZSM5 zeolite with a silica to alumina ratio of 30. The zeolite had been copper exchanged such that it contained approximately 4 weight percent copper. A NO conversion of 44% was obtained under these conditions. Since nitroethane is water soluble it therefore can be injected either as an aqueous solution, a pure liquid or as an aqueous of pure spray.

We claim:

1. A method of treating exhaust gas emissions, comprising the steps of:
   (a) introducing an organic hydrocarbon compound containing a nitro or nitroso functional group into said emissions as a reductant and at a location adjacent the source of emission generation thereby forming a reductant/emission mixture;
   (b) substantially immediately exposing said reductant/emission mixture to a transition metal exchanged silica ZSM5 zeolite catalyst having a $SiO_2/Al_2O_3$ ratio of about 10–1000 at a compatible space velocity; and
   (c) sequentially exposing the effluent from said zeolite catalyst to an oxidation catalyst.

2. The method according to claim 1, wherein said reductant is distributed in a ratio to $NO_x$ in said emission of at least about 1:1.

3. The method according to claim 1, wherein said compound is water soluble and is introduced in an aqueous solution at a metered volume proportional to the variance of $NO_x$ in said emissions.

4. The method according to claim 3, wherein said aqueous solution is sprayed.

5. The method according to claim 1, wherein step (c) is carried out at a space velocity of 20–80 K $hr^{-1}$.

6. The method according to claim 1, wherein the method results in a conversion efficiency of $NO_x$ in said emissions of at least 64% when no oxygen is present in said exhaust gas.

7. The method according to claim 1, wherein said compounds are selected from the group consisting of nitrosobenzene, nitromethane, nitroethane, 1-nitropropane, 2-nitroethanol, ethyl nitrate, ethyl nitrite, and mixtures thereof.

8. The method according to claim 1, wherein step (a) introduces the reductant as a mixture of steam and organic hydrocarbon compound containing a nitro or nitroso functional group.

9. A method of treating exhaust gas emissions from an internal combustion engine, the treatment providing for the staged conversion of HC, CO, and $NO_x$ comprising the steps of:
   (a) introducing an organic hydrocarbon compound containing nitro or nitroso functional groups into said emissions as a reductant and at a location adjacent the source of emission generation thereby forming a reductant/emission mixture;
   (b) substantially immediately exposing said reductant/emission mixture to a transition metal exchanged silica ZSM5 zeolite catalyst having a $SiO_2/Al_2O_3$ ratio of about 10–1000 at a compatible space velocity; and
   (c) sequentially exposing the effluent from said zeolite catalyst to an oxidation catalyst comprised of noble or base metals.

* * * * *